(12) United States Patent
Reid et al.

(10) Patent No.: US 6,276,835 B1
(45) Date of Patent: Aug. 21, 2001

(54) SPLIT CAM FOLLOWER DOCTOR BEARING

(75) Inventors: Robert A. Reid, Charlton City; Ronald F. Goodnow, Leicester, both of MA (US)

(73) Assignee: Thermo Web Systems, Inc., Auburn, MA (US)

(*) Notice: Subject to any disclaimer, the term of this patent is extended or adjusted under 35 U.S.C. 154(b) by 0 days.

(21) Appl. No.: 09/511,743

(22) Filed: Feb. 24, 2000

Related U.S. Application Data

(60) Provisional application No. 60/122,844, filed on Mar. 4, 1999.

(51) Int. Cl.[7] .................................................... F16C 17/02
(52) U.S. Cl. ............................................................ 384/434
(58) Field of Search ................................... 384/434, 441, 384/457, 294, 288

(56) References Cited

U.S. PATENT DOCUMENTS 3,291,541  12/1966  Dellinger .

FOREIGN PATENT DOCUMENTS 1147105  4/1963  (DE) .
2690719  11/1993  (FR) .
2750465  1/1998  (FR) .

Primary Examiner—Lenard A. Footland
(74) Attorney, Agent, or Firm—Samuels, Gauthier & Stevens

(57) ABSTRACT

A bearing assembly for supporting a rotatable and axially reciprocable shaft comprising: a housing surrounding a central axis and enclosing an interior space, the housing being subdivided into a top section separable from a bottom section;

a journal block located in the interior housing space and having a bore aligned on the central axis, the bore being dimensioned to receive and rotatably support the shaft, and the journal block having a top section separable from a bottom section; and rollers for supporting the journal block within the housing for reciprocal movement with the shaft in the direction of the central axis, the journal block and the housing being configured such that by separating their top sections from their respective bottom sections, the rollers may be accessed for replacement without disturbing the position of the bottom housing section.

15 Claims, 5 Drawing Sheets

SPLIT CAM FOLLOWER DOCTOR BEARING

REFERENCE TO RELATED APPLICATIONS

This application claims priority from provisional patent application Serial No. 60/122,844 filed Mar. 4, 1999.

BACKGROUND OF THE INVENTION

1. Field of the Invention

This invention relates generally to shaft bearings, and is concerned in particular with an improvement in the bearings used to support the rotatable and axially reciprocative shafts or journals of doctor blade support structures in web handling machines of the type typically found in paper and textile mills.

2. Description of the Prior Art

Many machines in the paper, textile and other industries employ rotary cylinders or drums as an integral part of web handling or processing operations. In many of these machines it is necessary to provide a means by which to remove built up contaminants or to remove the web from the surface of such cylinders and this is usually accomplished by contacting the cylinder surface with a structurally supported blade, creating a scraping or wiping action. The blade length is normally equivalent to the face length of the cylinder to be cleaned. Often the supporting structure and the blade are moved parallel to the cylinder axis, a distance of less than one inch, in a reciprocating motion to cause a more even wear distribution on the roll surface and blade tip.

In modern machines, the blade support structure or beam can be quite massive in size and weight. Structures up to 400 inches wide and weighing several tons have become quite common in some machines used in the paper industry. Supporting bearings for such structures have been a major consideration because of lost production and cost of repair time in the event of bearing failure.

Many machine processes expose bearings to harsh environments that often include high-temperatures, wet conditions, and chemical wash-downs. Such adverse conditions have a detrimental effect on the life expectancy of the bearings. Seal configuration and lubrication retention are significant design considerations.

In most applications, blade support structures require two modes of movement. The first, already mentioned, is the cross-machine reciprocating motion which is often five to ten cycles per minute. The second mode is a rotational motion allowing the blade to be positioned against the roll surface and then retracted to facilitate blade replacement when necessary.

The cross-machine, or reciprocating motion, is considered to be the "primary" mode due to the large number of cycles accumulated over long operating periods. A cycle rate of six strokes per minute will total over 3,000,000 cycles in a one year period of twenty-four hours per day operation. By way of contrast, rotational motion is normally one to four times per day, accumulating only 365 to 1460 load/unload cycles per year.

Bearing self-alignment capability is a major consideration due to initial "machined-in" and ongoing thermal changes in the blade support structure.

Another major concern is the amount of time required to replace or repair a worn or damaged bearing and the resulting cost of lost production.

In many instances, conventional bearings must be completely removed from the blade support structure journals or shafts in order to facilitate repair work. This results in loss of accurate positioning and alignment of the blade support structure relative to that machine rotary cylinder or drum, and often involves disassembly of a significant number of components.

An objective of the present invention is the provision of a bearing assembly which can be readily disassembled to accommodate replacement of worn components, without requiring separation of the entire assembly from the supported shaft or journal.

A companion objective of the present invention is the accommodation of the aforesaid disassembly without disturbing a fixed base component of the bearing housing, thus obviating any need to realign the bearing with adjacent machine components following reassembly.

SUMMARY OF THE INVENTION

A bearing assembly in accordance with the present invention includes a housing surrounding a central axis and enclosing an open interior space. The housing is subdivided into separable top and bottom sections, the latter section being adapted to be fixed and remain in place on a machine frame. A journal block is located within the open interior space of the surrounding housing. The journal block has a bore dimensioned to rotatably support a shaft or journal, and it too is subdivided into separable top and bottom sections. Rollers support the journal block for reciprocal movement with the shaft and relative to the surrounding housing. Preferably, housing side plates and seals are provided to exclude contaminants from the housing interior. These too are subdivided into separable top and bottom sections. The housing, journal block, side plates and seals are configured such that by separating their top sections from their respective bottom sections, the rollers and seals may be accessed for replacement without removing the entire bearing assembly from the journal or shaft, and without disturbing the position of the housing bottom section on the machine frame.

These and other objectives, features and advantages will now be described in greater detail with reference to the accompanying drawings, wherein:

DETAILED DESCRIPTION OF PREFERRED EMBODIMENTS

Figure 1:
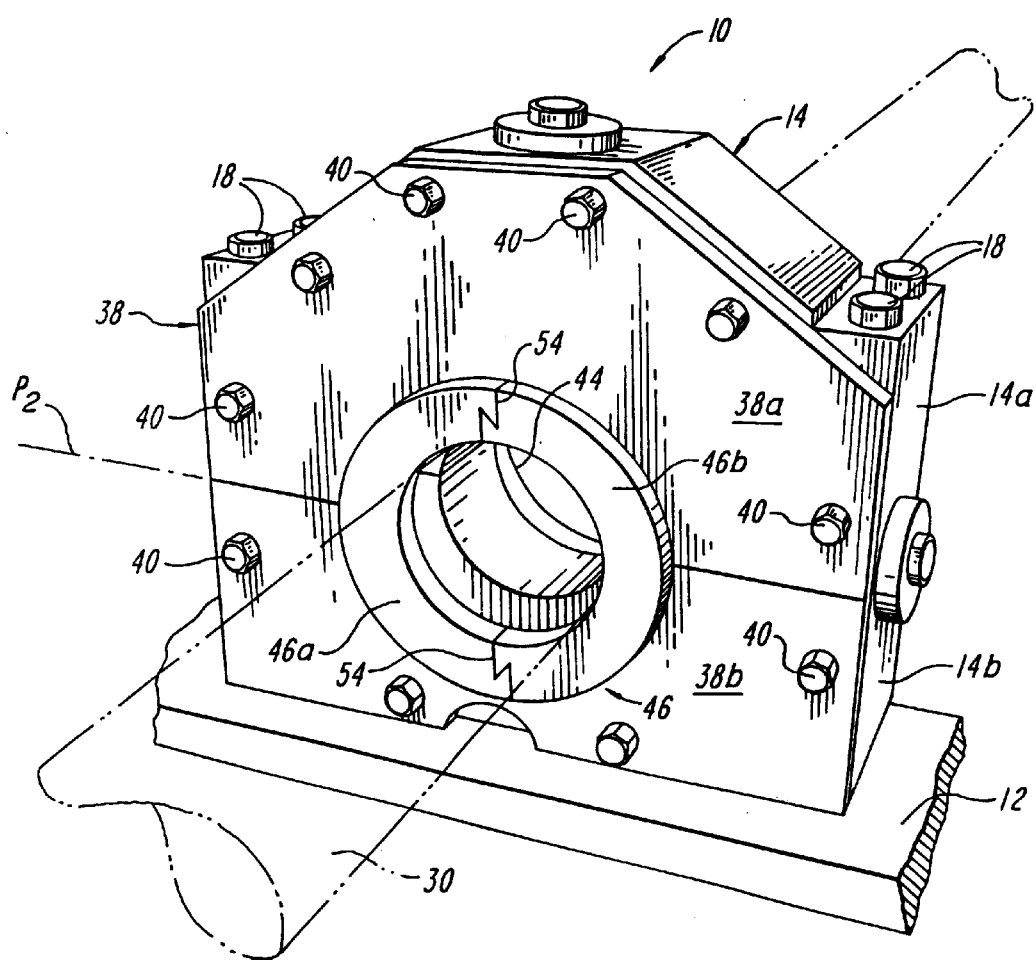
FIG. 1 is a perspective view of a preferred embodiment of a bearing assembly in accordance with the present invention.
Figure 2:
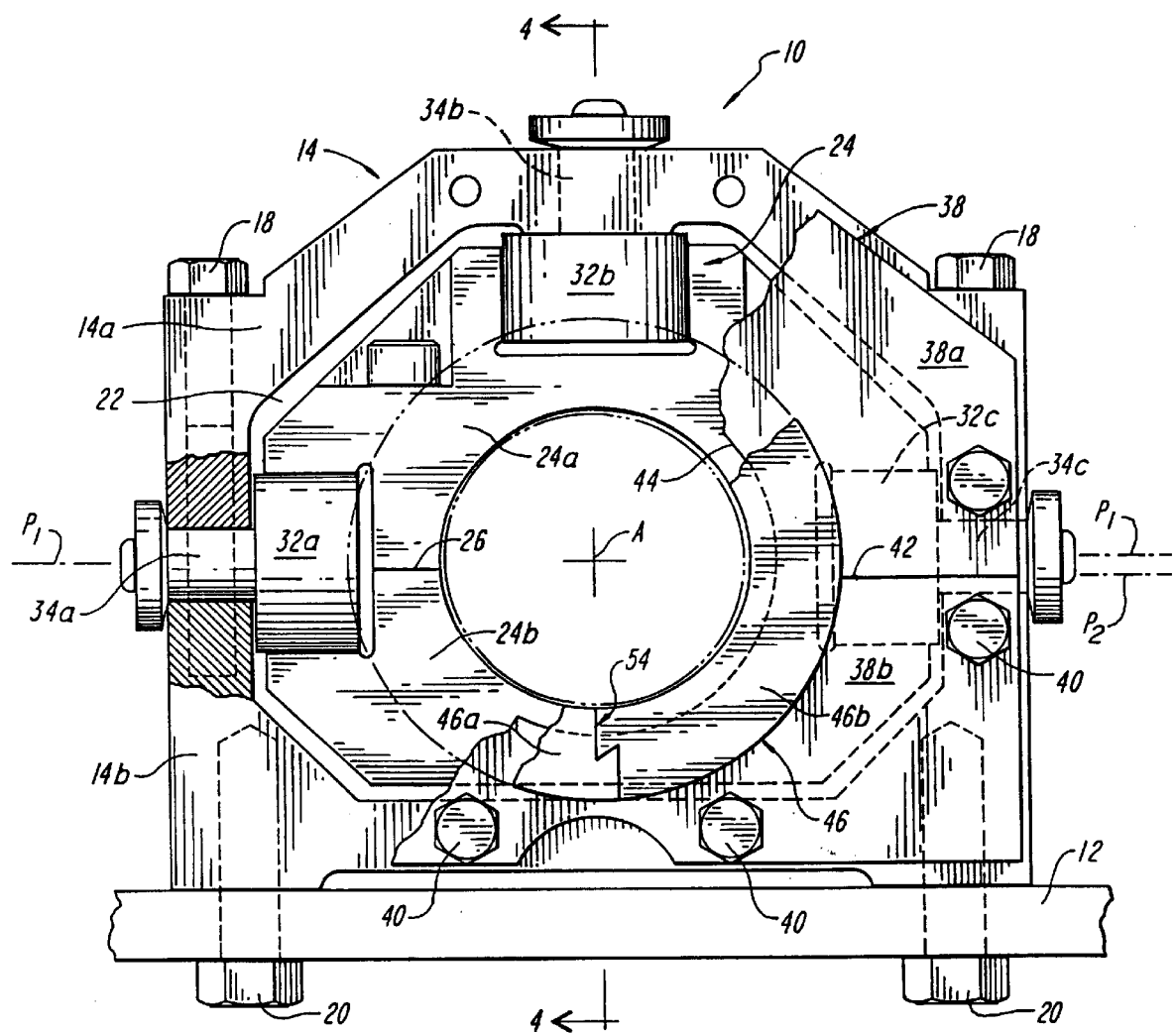
FIG. 2 is a side view of the bearing assembly, with portions of the side plate, seal and housing broken away.
Figure 3:
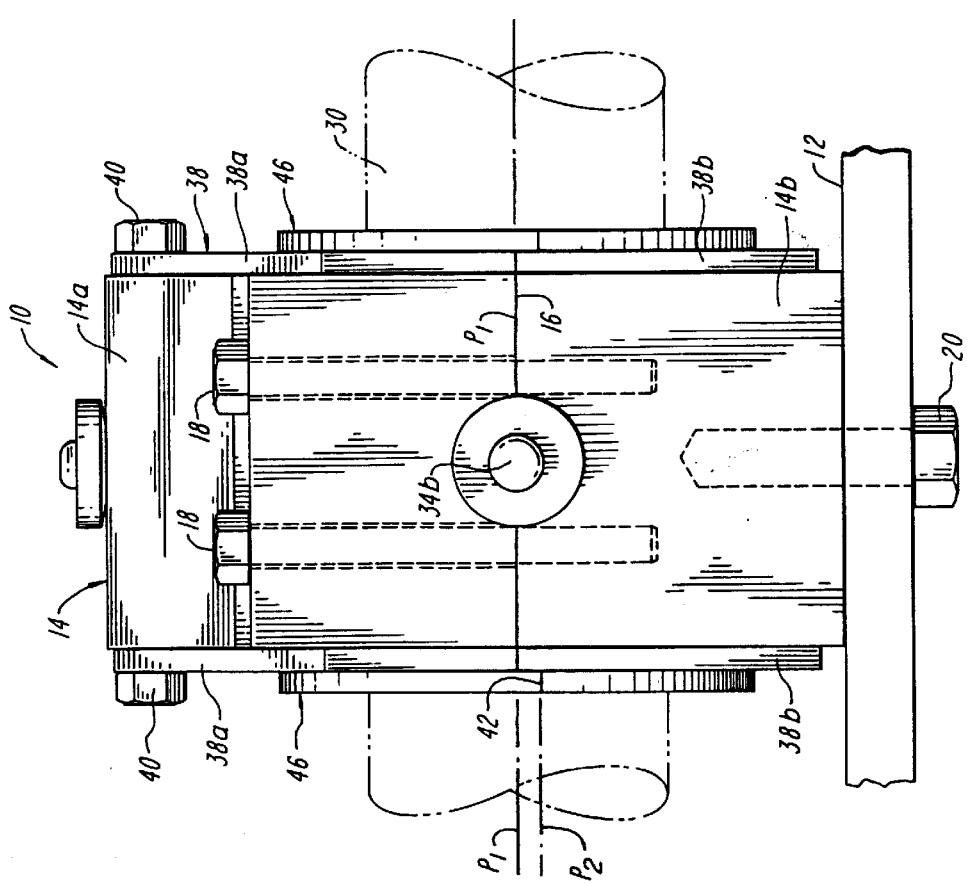
FIG. 3 is an end view of the bearing assembly.

Referring initially to FIGS. 1–5, a bearing assembly in accordance with the present invention is generally depicted at 10 fixed in place on a machine frame 12 or other like support structure. The bearing assembly includes an outer housing structure 14 subdivided into mating top and bottom sections 14a, 14b separably joined at common interface 16 by connecting bolts 18. The bottom housing section 14b is fixed in place on the machine frame 12 by any convenient means, typically bolts 20 or the like. The outer housing structure 14 surrounds a central axis "A" and encloses an interior space 22 in which is located a journal block 24 also subdivided into top and bottom sections 24a, 24b separably joined at a common interface 26 by connecting bolts 28. The journal block 24 has a bore aligned on the central axis A and dimensioned to rotatably support a shaft 30.

Rollers 32a, 32b and 32c support the journal block 24 for reciprocal movement with the shaft 30 in the direction of the central axis A. The rollers 32a, 32c are disposed horizontally and are rotatably supported respectively on stub shafts 34a, 34c captured in confronting grooves 36 (best seen in FIG. 5) at the interface 16 between the top and bottom housing sections 14a, 14b. Roller 32b is vertically disposed and rotatably carried on a stub shaft 34b protruding downwardly through the top housing section 14a.

The common interfaces 16, 26 of the outer housing structure 14 and journal block 24 lie on a common horizontal plane "$P_1$" which also contains the central axis "A".

Side plates 38 axially enclose the interior housing space 22. The side plates are also subdivided into top and bottom sections 38a, 38b, each being attached respectively to the opposite sides of the top and bottom housing sections 14a, 14b by machine screws indicated typically at 40. The top and bottom sections 38a, 38b of the side plates meet at a common interface 42 lying in a plane $P_2$ spaced below plane $P_1$.

The side plates 38 define circular openings 44 aligned with the central axis A for accommodating passage therethrough of the shaft 30. Circular metallic seals 46 line the openings 44 and are configured and dimensioned to sealingly contact the shaft 30.

Figure 4:
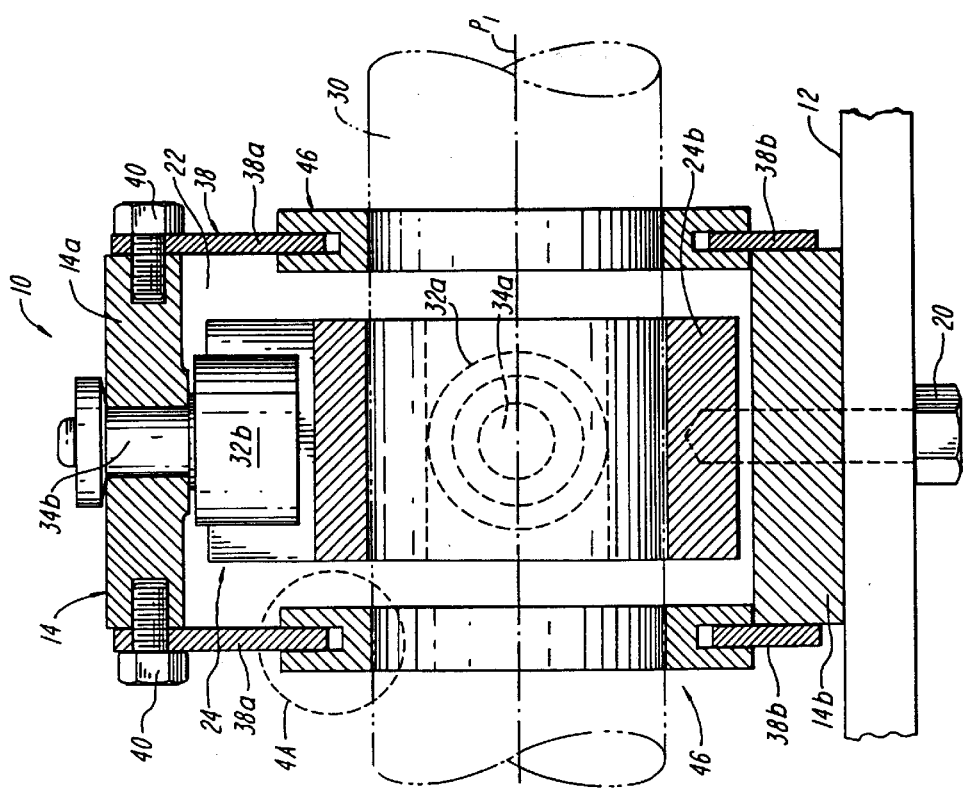
FIG. 4 is a sectional view taken along line 4—4 of FIG. 2.
Figure 4A:
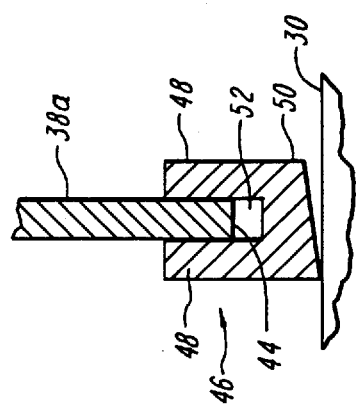
FIG. 4A is an enlarged view of a portion of FIG. 4.

As can best be seen in FIG. 4A, the seals 46 have generally channel-shaped cross sections defined by radially outwardly extending axially spaced side walls 48 joined by an inner axially extending web 50. The side plates 38 are held between the seal side walls 48, with the outer diameter of the web 50 being smaller than the inner diameter of the side plate openings 44, thereby providing space 52 to accommodate slight lateral shaft movement.

The seals 46 are separated into mating sections 46a, 46b joined one to the other at mechanically interengageable interfaces which preferably comprise radially engageable mortice and tenon configurations.

In light of the foregoing, it will now be understood by those skilled in the art that the journal block 24 rotatably supports the shaft 30, and the support provided by the rollers 32a–c accommodates reciprocal movement of the journal block with the shaft in the direction of axis A.

The seals 46 can be easily replaced by simply detaching the top sections 38a of the side plates from the top section 14a of the housing, and then removing and replacing the worn seal sections 46a, 46b.

Should it become necessary to replace one or more of the rollers 32a–c, the top housing section 14a, together with the top side plate sections 38a attached thereto are first separated from their respective bottom sections, thus providing access to the vertical roller 32b. Thereafter, the top section 24a of the journal block may be separated from its mating bottom section 24b, thereby freeing the horizontal rollers 32a, 32c for easy replacement.

All of this can be accomplished without disturbing the bottom housing section 14b, which can remain in place in its originally aligned position relative to other components, e.g., a roll being doctored by equipment carried on the shaft 30.

Figure 6:
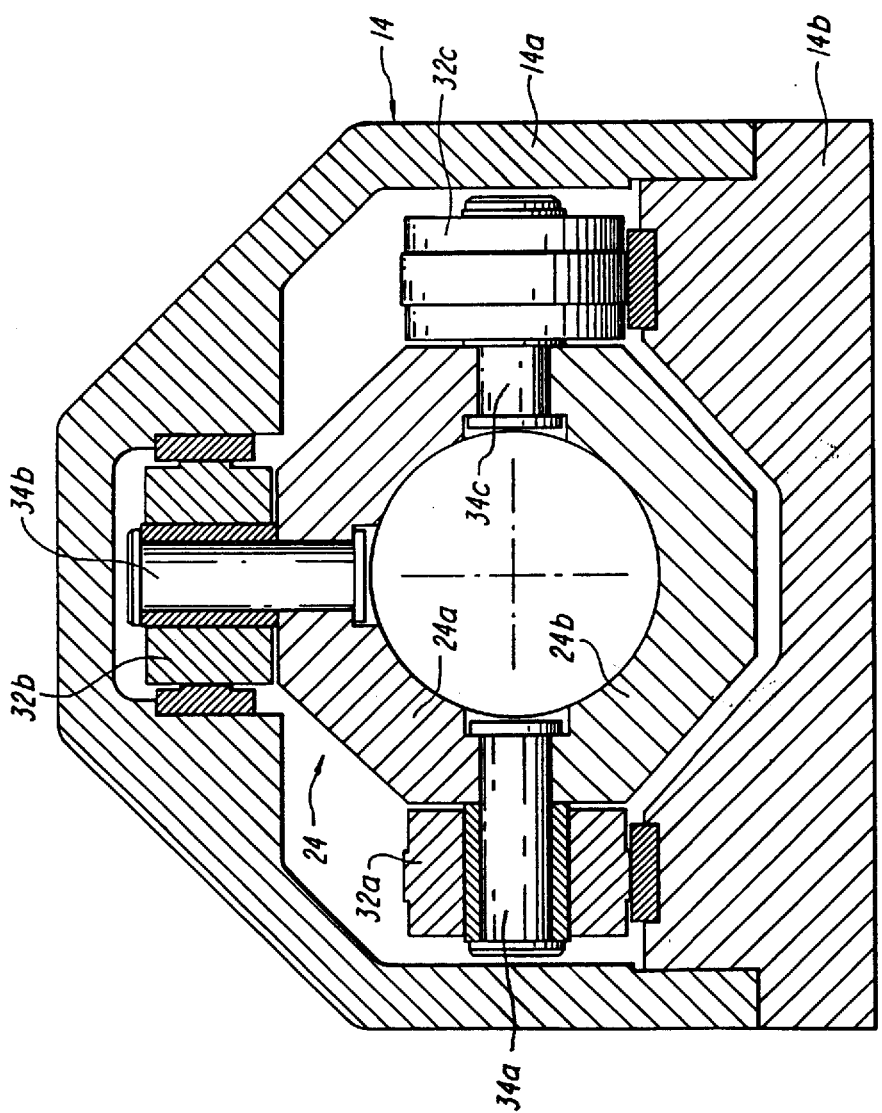
FIG. 6 is a sectional view through an alternative embodiment of a bearing assembly in accordance with the present invention.
Figure 5:
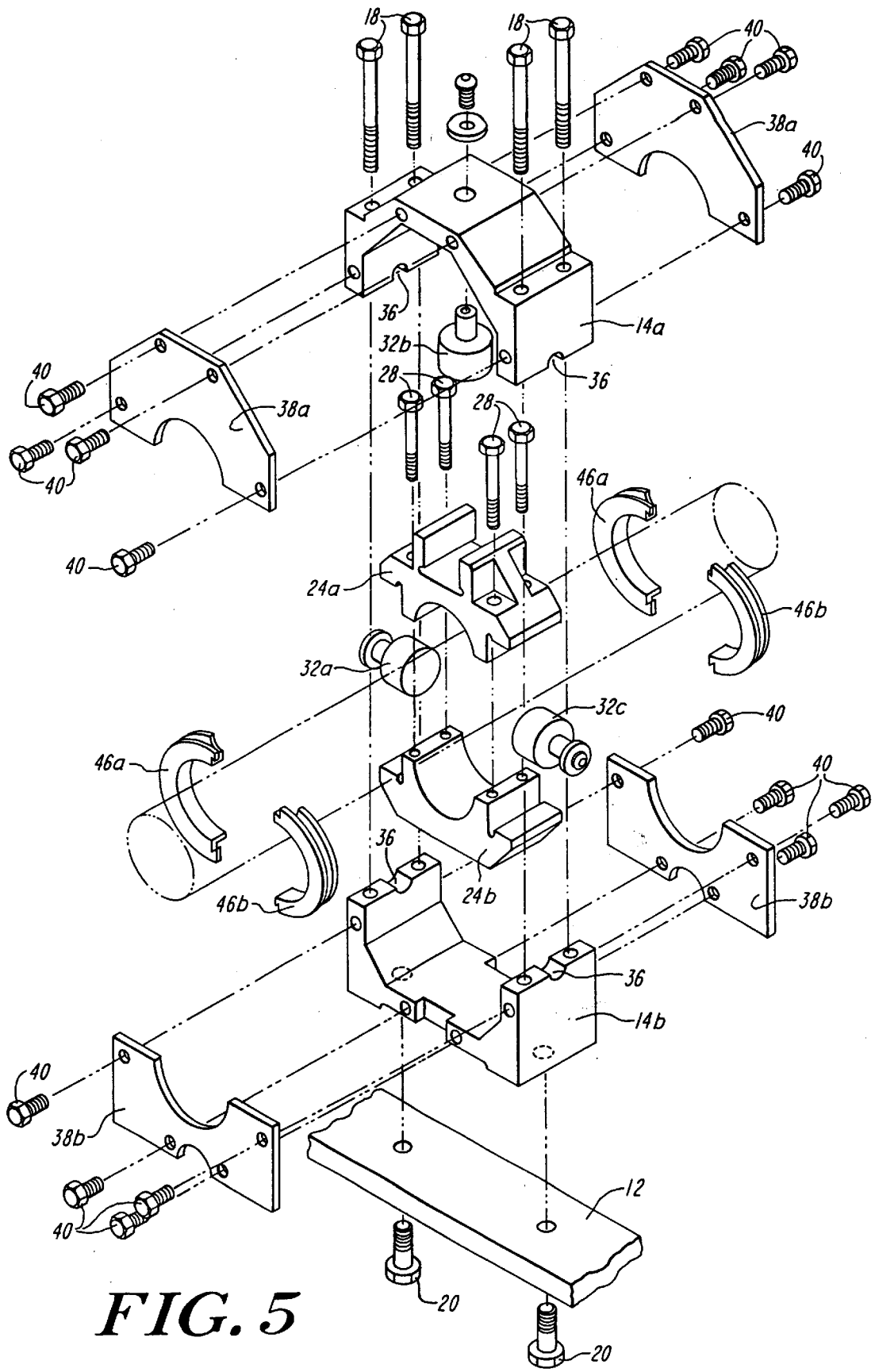
FIG. 5 is an exploded perspective view of the bearing assembly.

Various modifications may be made to the above-described embodiment without departing from the spirit of the invention and the scope of the appended claims. One non-limiting example of such modification is disclosed in FIG. 6 where the outer housing 14 and inner journal block 24 are again subdivided into separable top and bottom sections 14a, 14b and 24a, 24b. Here, however, the rollers 32a–c have their respective stub shafts 34a–c attached to the journal block 24 rather than to the outer housing 14.

We claim:

1. A bearing assembly for supporting a rotatable and axially reciprocable shaft, said bearing assembly comprising:

a housing surrounding a central axis and enclosing an interior space, said housing having a top section separable from a bottom section;

a journal block located in said interior space and having a bore aligned on said central axis, said bore being dimensioned to receive and rotatably support said shaft, said journal block having a top section separable from a bottom section; and rollers for supporting said journal block within said housing for reciprocal movement with said shaft in the direction of said central axis, said journal block and said housing being configured such that by separating their top sections from their respective bottom sections, said rollers may be accessed for replacement without disturbing the position of the bottom section of said housing.

2. The bearing assembly of claim 1 wherein said rollers are supported on shafts carried by said housing.

3. The bearing assembly of claim 1 wherein said rollers are supported on shafts carried by said journal block.

4. The bearing assembly of claim 1 wherein said housing and said journal block are subdivided into said top and bottom sections at a common horizontal plane.

5. The bearing assembly of claim 4 wherein said central axis lies in said horizontal plane.

6. The bearing assembly of claims 4 or 5 wherein two of said rollers are arranged in an opposed relationship and are supported on shafts held between the top and bottom sections of said housing.

7. The bearing assembly of claim 6 wherein a third of said rollers is supported on a shaft depending vertically from the top section of said housing.

8. The bearing assembly of claim 1 wherein said housing further includes side plates axially enclosing said interior space, said side plates having openings aligned with said central axis for accommodating passage therethrough of said shaft, said side plates being subdivided into separable top and bottom sections attached respectively to the top and bottom sections of said housing.

9. The bearing assembly of claim 8 further comprising circular seal members lining the openings in said side plates, said seal members being configured and dimensioned to sealingly contact said shaft.

10. The bearing assembly of claim 9 wherein said seal members have generally channel-shaped cross sections opening radially outwardly and wherein the edges of said side plates bordering said openings are received in said channel-shaped cross sections.

11. The bearing assembly of claim 10 wherein said channel-shaped cross sections are defined by radially outwardly extending axially spaced side walls joined by an inner axially extending web, the side plates of said housing being held between said side walls, and the outside diameter of said web being smaller than the inside diameter of said openings.

12. The bearing assembly of claims 9–11 wherein said seal members are subdivided into separable mating sections.

13. The bearing assembly of claim 12 wherein the separable mating sections of said seal members are joined one to the other at mechanically interengageable interfaces.

14. The bearing assembly of claim 13 wherein said interfaces are defined by radially engageable mortice and tenon configurations.

15. A bearing assembly for supporting a rotatable and axially reciprocable shaft, said bearing comprising:

a journal block having a bore extending therethrough, said journal block being subdivided into mating bottom and top sections along a horizontal plane passing through the axis of said bore, said bore being dimensioned to axially receive and rotatably support said shaft;

first connecting means for engaging and separably assembling the bottom and top sections of said journal block;

a housing surrounding said journal block, said housing being subdivided along said horizontal plane into mating bottom and top sections;

second connecting means for engaging and separably assembling the bottom and top sections of said housing; and roller means for supporting said journal block within said housing for reciprocal movement with said shaft, said first and second connecting means being disengageable to accommodate disassembly of the top and bottom sections of said housing and said journal block and replacement of said roller means without disturbing the position of the bottom section of said housing.

* * * * *